US010769190B2

(12) United States Patent
Liu et al.

(10) Patent No.: US 10,769,190 B2
(45) Date of Patent: Sep. 8, 2020

(54) GROUP ANALYSIS USING CONTENT DATA (71) Applicant: Hewlett-Packard Development Company, L.P., Houston, TX (US)

(72) Inventors: Lei Liu, Palo Alto, CA (US); Georgia Koutrika, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 634 days.

(21) Appl. No.: 15/518,756

(22) PCT Filed: Jan. 23, 2015

(86) PCT No.: PCT/US2015/012706
§ 371 (c)(1),
(2) Date: Apr. 12, 2017

(87) PCT Pub. No.: WO2016/118157
PCT Pub. Date: Jul. 28, 2016

(65) Prior Publication Data
US 2017/0235822 A1    Aug. 17, 2017

(51) Int. Cl.
*G06Q 50/20* (2012.01)
*G06F 16/335* (2019.01)
*G06Q 10/06* (2012.01)
*G06Q 10/10* (2012.01)

(52) U.S. Cl.
CPC ....... *G06F 16/337* (2019.01); *G06Q 10/0631* (2013.01); *G06Q 10/105* (2013.01); *G06Q 50/20* (2013.01)

(58) Field of Classification Search
CPC ..... G06Q 50/20; G06F 16/337; G06F 40/169; G06F 40/117; G06F 16/93; G06F 16/58

USPC ......... 707/999.102, 758, 804; 715/230, 750, 715/751, 229; 434/362, 167, 178, 350, 434/262, 308, 309, 365
See application file for complete search history.

(56) References Cited

U.S. PATENT DOCUMENTS

| | | | |
|---|---|---|---|
| 6,760,748 B1 | 7/2004 | Hakim | |
| 7,536,637 B1 | 5/2009 | Nauerz et al. | |
| 7,904,797 B2 | 3/2011 | Wong et al. | |
| 8,930,351 B1 | 1/2015 | Kim et al. | |
| 9,269,274 B1* | 2/2016 | Hu | ........................... G09B 7/00 |

(Continued)

FOREIGN PATENT DOCUMENTS

EP    2199963 A1    6/2010

OTHER PUBLICATIONS

J.S. Kanchana et al, "Clustering Unanimous Web Users Based on Rating and User-signature", Aug. 2014.

*Primary Examiner* — Robert W Beausoliel, Jr.
*Assistant Examiner* — Pedro J Santos
(74) *Attorney, Agent, or Firm* — HP Inc. Patent Department (57) ABSTRACT

Examples relate to grouping students using content fields. Student data including a plurality of content fields is obtained. Each content field of the plurality of content fields includes a value that represents an unstructured marking linked to a content data collection. Student profiles are generated by assigning a student identification number to each of the plurality of content fields. Each of the student identification numbers are organized into at least one student group by analyzing the set of student profiles.

15 Claims, 5 Drawing Sheets

(56) References Cited

U.S. PATENT DOCUMENTS

| | | | |
|---|---|---|---|
| 2002/0078088 A1* | 6/2002 | Kuruoglu | G06F 40/169 715/232 |
| 2005/0223315 A1* | 10/2005 | Shimizu | G06F 40/169 715/230 |
| 2006/0194186 A1 | 8/2006 | Nanda | |
| 2007/0282791 A1* | 12/2007 | Amzalag | G06Q 10/10 |
| 2008/0168055 A1 | 7/2008 | Rinearson et al. | |
| 2010/0159437 A1* | 6/2010 | German | G06Q 30/02 434/433 |
| 2011/0202774 A1* | 8/2011 | Kratsch | G06F 21/6254 713/189 |
| 2012/0278324 A1 | 11/2012 | King et al. | |
| 2012/0330953 A1 | 12/2012 | Buss et al. | |
| 2014/0234822 A1* | 8/2014 | Srinivas | G09B 5/00 434/350 |
| 2015/0142687 A1* | 5/2015 | VanPolen | G06Q 50/2057 705/328 |
| 2015/0379879 A1* | 12/2015 | Selkirk | G06Q 50/01 434/309 |
| 2017/0301252 A1* | 10/2017 | Wu | G06Q 30/0272 |
| 2018/0211553 A1* | 7/2018 | Liebenberg | G06F 17/241 |

* cited by examiner

GROUP ANALYSIS USING CONTENT DATA

BACKGROUND

Grouping students is thought to be an effective strategy to improve student performance. Homogeneous grouping is one method of grouping students. Homogeneous grouping includes organizing students in a way that everyone in the group has a similar learning characteristic, such as learning habits or skill level. Heterogeneous grouping is another method of grouping students. Heterogeneous grouping is typically used with collaborative learning environments and organizes students with mixed or different learning skills and characteristics together to use each student's unique contributions to help the group.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

When grouping students, the students may be divided based on ability and/or learning habits to provide learning environments that improve student performance. Typical approaches to dividing students includes teachers or students manually creating groups and automated methods that use answers to predefined questions to group students. The predefined questions provide a general understanding of learning habits, but may not capture how a student performs in specific classes or with specific topics. Both manual and automated methods typically group students based on learning habits without looking into a student's personal information.

Examples relate to grouping students using content fields. Student data including a plurality of content fields is obtained. Each content field of the plurality of content fields includes a value that represents an unstructured marking linked to a content data collection. Student profiles are generated by assigning a student identification number to each of the plurality of content fields. Each of the student identification numbers are organized into at least one student group by analyzing the set of student profiles.

As used herein, "content data collection" refers to a control or structured document with subject matter. For example, content data collection may include an article or passages.

As, used herein, "content fields" refers to defined portions or locations in articles or passages that may be used to collect data that can be evaluated or compared within each of the defined portions.

As used herein, "unstructured markings" refers to data received from a user that is not a selection from a limited or pre-defined list of items. For example, unstructured markings may include free hand annotations in a margin of a content data collection or in-line with the content data collection. The unstructured markings may also include highlighting or underlining of a portion of the content data collection.

As used herein, "clustering method" refers to a manner for grouping or classifying data.

As used herein, "homogeneous grouping" refers to a selection of students that seem to have the same difficulties related to a particular topic or text, similar preferences based on their markings, or assimilated the same concepts or topics.

Figure 1:
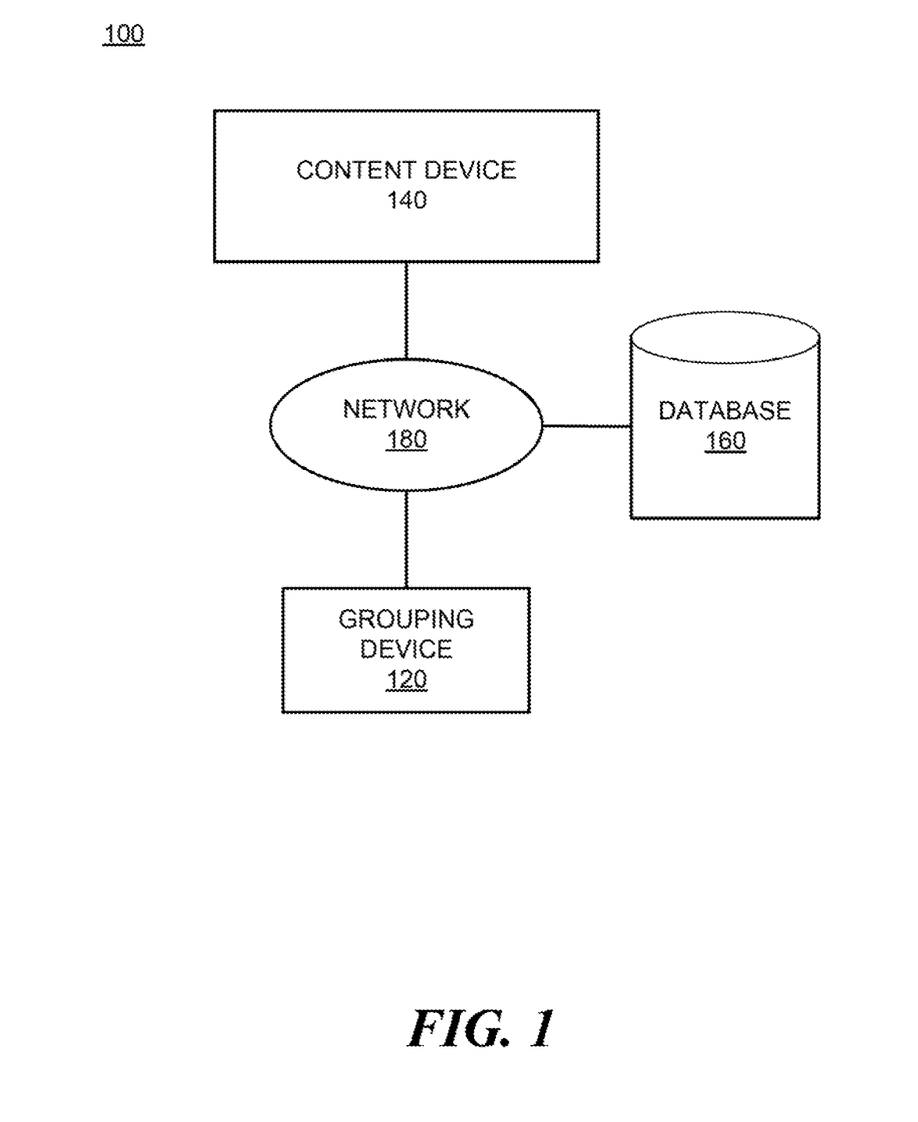
FIG. 1 is a block diagram of a system for grouping students according to an example.

Referring now to the drawings, FIG. 1 is a block diagram of a system for grouping students according to an example. System 100 may be implemented in a number of different configurations without departing from the scope of the disclosed examples. In FIG. 1, system 100 may include a grouping device 120, a content device 140, a database 160, and a network 180 for connecting grouping device 120 with database 160 and/or content device 140.

Grouping device 120 may be a computing system that performs various functions consistent with disclosed examples, such as grouping students using content fields. For example, grouping device 120 may be a desktop computer, a laptop computer, a tablet computing device, a mobile phone, a server, and/or any other type of computing device. In some examples, grouping device 120 may receive a set of student data for a plurality of students. The set of student data including a set of values for a plurality of content fields. The set of values represent a plurality of unstructured markings associated with a content data collection. The set of values and the content data field may be stored in database 160. Grouping device 120 may generate a student profile by associating a student identification number with the plurality of content fields for the set of student data received. The student profile may be stored in database 160, for example, as a matrix of rows and columns. The rows represent the plurality of students. The columns manage the student identification number and the plurality of content fields for each student. Grouping device 120 may organize the student identification numbers based on the plurality of content fields for each student. Student identification numbers may be organized based on an analysis of the content fields using, for example, a cluster method. Examples of grouping device 120 and certain functions that may be performed by grouping device 120 are described in greater detail below with respect to, for example, FIGS. 2-5.

Content device 140 may be any device that maintains, receives, or transfers content data from a content data collection. For example, content device 140 may be a scanning device or a computing device, such as a desktop computer, a laptop computer, a table computing device, a mobile phone, a server, or any other type of computing device. Content device 140 may receive, transfer, or otherwise access content data collections, such as articles and controlled data sets, used to collected data for the grouping device 120. For examples content device 140 may define the plurality of content fields from the content data collection by: dividing the content data collection into the plurality of content fields, and assigning a set of values to the plurality of content fields. The set of values to represent the plurality of unstructured markings. The plurality of unstructured markings comprise at least one marking selected from a highlight marking, an underline, and an annotation to the content data collection readable by content device 140, such as a rating or question. Additionally, in some examples, content device 140 may scan student data to obtain the plurality of unstructured markings. The unstructured markings may be assigned a set of values for a plurality of content fields. The set of values represent a plurality of unstructured markings associated with a content data collection. For example, content device 140 may include a processor, and may access, via the processor, a digital version of the content data collection. The digital version may include unstructured markings on the content data collection such that the content device 140 is able to read the unstructured markings and translate the information into values in data fields. An example of a content data collection, unstructured markings, and data fields are discussed in greater detail below with respect to, for example, FIGS. 4-5.

Database 160 may be any type of storage system configuration that facilitates the storage of data. For example, database 160 may facilitate the locating, accessing, and retrieving of data (e.g., SaaS, SQL, Access, etc. databases, XML files, etc.). Database 160 can be populated by a number of methods. For example, grouping device 120 may populate database 160 with database entries generated by grouping device 120, and store the database entries in database 160. As another example, grouping device 120 may populate database 160 by receiving a set of database entries from another component, a wireless network operator, and/or a user of content device 140, and storing the database entries in database 160. In yet another example, content device 140 may populate database 160 by, for example, transmitting data or obtaining data from student data, such as through use of a scanner or scanning device connected to the content device 140. The database entries can contain a plurality of fields, which may include information related to students and content, such as student names, student identification numbers, content fields, values for content fields, and content data collections. While in the example shown in FIG. 1 database 160 is a single component external to components 120 and 140, database 160 may comprise separate databases and/or may be part of devices 120, 140, and/or another device. In some implementations, database 160 may be managed by components of devices 120 and/or 140 that are capable of accessing, creating, controlling and/or otherwise managing data remotely through network 180.

Network 180 may be any type of network that facilitates communication between remote components, such as grouping device 120 and content device 140. For example, network 180 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one grouping device 120, content device 140, database 160, and network 180, system 100 may include any number of components 120, 140, 160, and 180, as well as other components not depicted in FIG. 1. System 100 may also omit any of components 120, 140, 160, and 180. For example, grouping device 120 and content device 140 may be directly connected instead of being connected via network 180. As another example, grouping device 120 and content device 140 may combined to be a single device.

Figure 2:
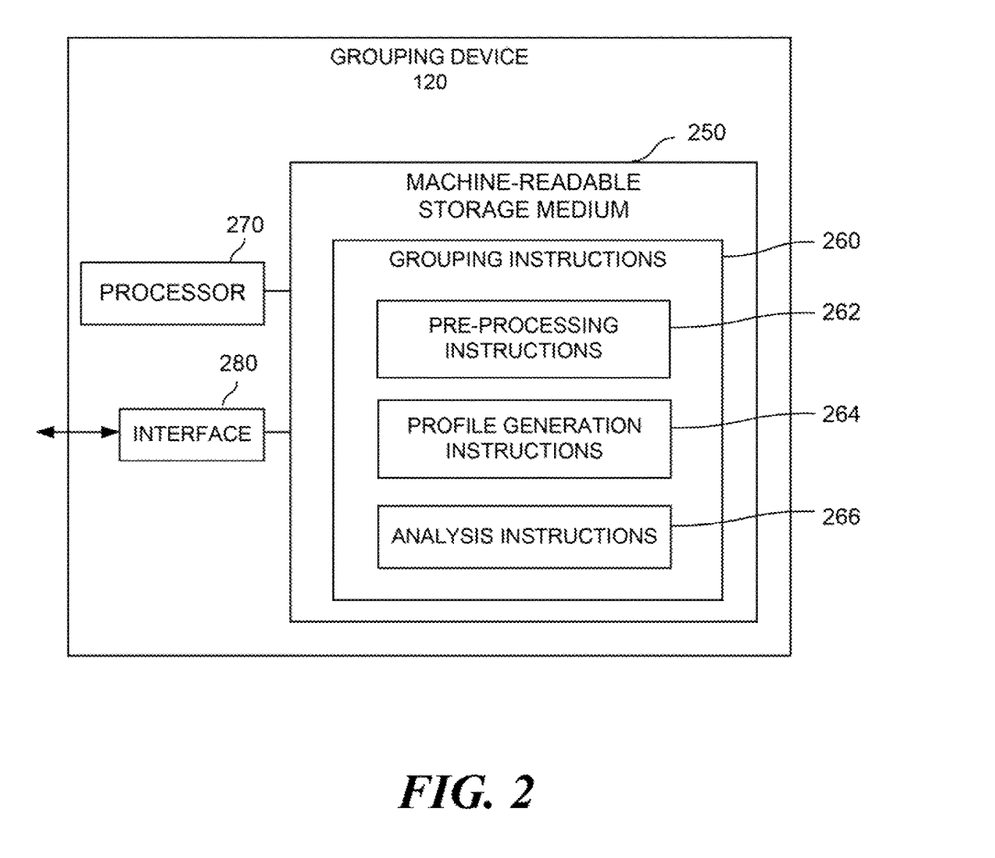
FIGS. 2-3 are block diagrams of grouping devices according to examples.
Figure 3:
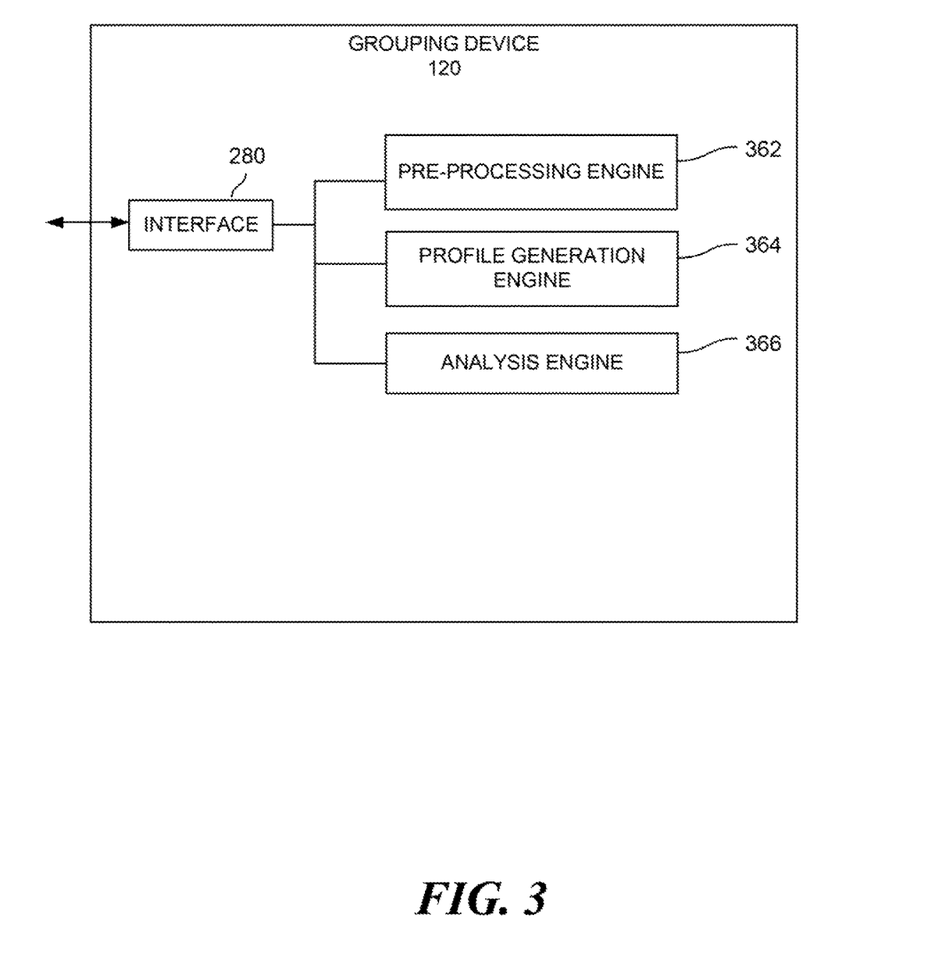

FIGS. 2-3 are block diagrams of grouping devices according to examples. Referring to FIG. 2, a grouping device 120 is illustrated. In certain aspects, grouping device 120 may correspond to multiple grouping device 120 of FIG. 1. Grouping device 120 may be implemented in various ways. For example, grouping device 120 may be a special purpose computer, a server, a mainframe computer, a computing device executing instructions that receive and process information and provide responses, and/or any other type of computing device. In the example shown in FIG. 2, grouping device 120 may include a machine-readable storage medium 250, a processor 270, and an interface 280.

Processor 270 may be at least one processing unit (CPU), microprocessor, and/or another hardware device to execute instructions to perform operations. For example, processor 270 may fetch, decode, and execute grouping instructions 260 (e.g., instructions 262, 264, and/or 266) stored in machine-readable storage medium 250 to perform operations related to examples provided herein.

Interface 280 may be any device that facilitates the transfer of information between grouping device 120 and other components, such as content device 140 and/or database 160. In some examples, interface 280 may include a network interface device that allows device to receive and send data to and from network 180. For example, interface 280 may retrieve and process data related to grouping students from database 160 via network 180.

Machine-readable storage medium 250 may be any electronic, magnetic, optical, or other physical storage device that stores executable instructions. Thus, machine-readable storage medium 250 may be, for example, memory, a storage drive, an optical disc, and/or the like. In some implementations, machine-readable storage medium 250 may be non-transitory, such as a non-transitory computer-readable storage medium, where the term "non-transitory" does not encompass transitory propagating signals. Machine-readable storage medium 250 may be encoded with instructions that, when executed by processor 270, perform operations consistent with the examples herein. For example, machine-readable storage medium 250 may include instructions that perform operations that cluster students into groups using student profiles generated from content fields that are extracted from student data. In the example shown in FIG. 2, machine-readable storage medium 250 may include pre-processing instructions 262, profile instructions 264, and analysis instructions 266.

Pre-processing instructions 262 may function to extract a plurality of content fields from a set of student data collected from a plurality of students. For example, when pre-processing instructions 262 are executed by processor 270, pre-processing instructions 262 may cause processor 270 of grouping device 120, and/or another processor to assign each content field of the plurality of content fields a value that represents an unstructured marking associated with a content data collection. The execution of the pre-processing instructions 262 may also cause processor 270 of grouping device 120, and/or another processor to define the plurality of content fields corresponding to a plurality of portions of the content data collection. The content fields may be defined based on the content data collection either before or after the content fields are extracted. Alternatively, the definition of the content fields may be based on an evaluation of the unstructured markings received, in which case, the definitions would be performed after content fields are extracted from student data. Examples of the steps involved in the pre-processing are described in further detail below with respect to, for example, FIGS. 4-5.

Profile instructions 264 may function to generate student profiles. For example, when profile instructions 264 are executed by processor 270, profile instructions 264 may cause processor 270 of grouping device 120, and/or another processor to associate the plurality of content fields with a set of student identification numbers to generate a plurality of student profiles. Examples of the steps involved in generating student profiles are described in further detail below with respect to, for example, FIGS. 4-5.

Analysis instructions 266 may function to cluster the set of student identification numbers. For example, when analysis instructions 266 are executed by processor 270, analysis instructions 266 may cause processor 270 of grouping device 120, and/or another processor to analyze the plurality of content fields in order to cluster the set of student identification numbers using content fields. Analysis of the plurality of content fields may include grouping the set of student identification numbers based on common features. For example, common features of the unstructured marking, may include markings to the same paragraph or sentence, the same type of marking, i.e., highlighting, underlining, annotations, marking the same topic within the content data collection. Examples of the steps involved in clustering or grouping student identification numbers are described in further detail below with respect to, for example, FIGS. 4-5.

Referring to FIG. 3, grouping device 140 is illustrated to include a pre-processing engine 362, a profile engine 364, and an analysis engine 366. In certain aspects, grouping device 120 may correspond to grouping device 120 of FIGS. 1-2. Grouping device 120 may be implemented in various ways. For example, grouping device 120 may be a computing system and/or any other suitable component or collection of components that group students.

Interface 280 may be any device that facilitates the transfer of information between grouping device 120 and external components. In some examples, interface 280 may include a network interface device that allows grouping device 120 to receive and send data to and from a network. For example, interface 280 may retrieve and process data related to grouping students using student data from database 160.

Engines 362, 364, and 366 may be electronic circuitry for implementing functionality consistent with disclosed examples. For example, engines 362, 364, and 366 may represent combinations of hardware devices and instructions to implement functionality consistent with disclosed implementations. For example, the instructions for the engines may be processor-executable instructions stored on a non-transitory machine-readable storage medium and the hardware for the engines may include a processor to execute those instructions. In some examples, the functionality of engines 362, 364, and 366 may correspond to operations performed by grouping device 120 of FIGS. 1-2, such as operations performed when grouping instructions 260 are executed by processor 270. In FIG. 3, pre-processing engine 362 may represent a combination of hardware and instructions that performs operations similar to those performed when processor 270 executes pre-processing instructions 262. Similarly, profile engine 364 may represent a combination of hardware and instructions that performs operations similar to those performed when processor 270 executes profile instructions 264, and analysis engine 366 may represent a combination of hardware and instructions that performs operations similar to those performed when processor 270 executes, analysis instructions 266.

Figure 4:
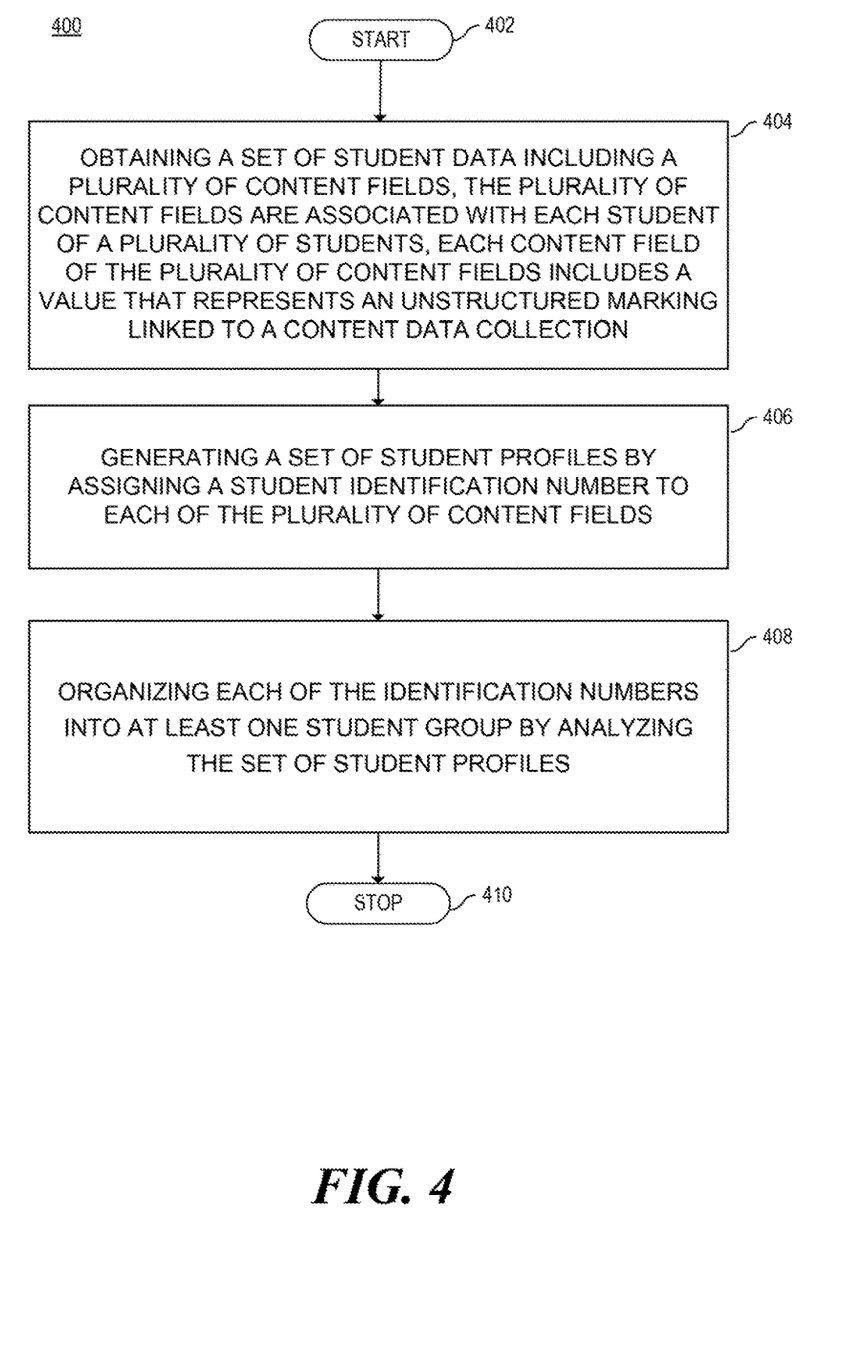
FIG. 4 is flow chart of a process for grouping students according to an example.

FIG. 4 is a flow chart of a process 400 for grouping students according to an example. Although execution of process 400 is described below with reference to system 100, other suitable systems and/or devices for execution of at least one step of process 400 may be used. For example, processes described below as being performed by system 100 may be performed by grouping device 120, content device 140, and/or any other suitable device or system. Process 400 may be implemented in the form of executable instructions stored on a storage device, such as a machine-readable storage medium, and/or in the form of electronic circuitry.

Process 400 may start (step 402) by obtaining a set of student data that includes a plurality of content fields (step 404). The plurality of content fields are associated with each student of a plurality of students. Each content field of the plurality of content fields includes a value that represents an unstructured marking linked to a content data collection. The content fields may be predetermined. For example, content device 140 of system 100 may query or otherwise access database 160 to determine the content fields stored in a storage device, such as database 160. The content fields may be, for example, defined as paragraphs, sentences, specific words, types of highlighting, types of annotation, location of annotation, etc. The plurality of content fields in the content data collection may be defined based on the content data collection.

The content data may be defined prior to obtaining student data using a baseline definition or it may be defined after obtaining student data. For example, if the content fields are defined after obtaining the student data, the unstructured markings, such as highlights and annotations, may be used to define the content fields and determine the values. In an example, unstructured data obtained from student data may be used to define the content fields or adjust the definitions of the content fields. For example, content device 140 may define the content fields based on topics of interest identified by students, as indicated in the student data, i.e., through analysis of the unstructured markings on, the content data collection. The content fields, as defined, may then be stored in a storage device, such as database 160. Similarly, the set of values that represent the plurality of content fields may be determined or assigned by content device 140 based on standard values corresponding to unstructured markings. Alternatively, values may be determined or assigned by content device 140 based on an evaluation of student data, i.e., unstructured markings, received with an option to adjust the determination and assignment of the values as new student data, is received and evaluated. The values maybe stored in a storage device, such as database 160.

Process 400 may also include generating a set of student profiles by assigning a student identification number to each of the plurality of content fields (step 406). For example, grouping device 120 and/or content device 140 may determine the values associated with the plurality of content fields for each student from the set of student data to build the set of student profiles. The values, content fields, student data, and student profile data may be stored in a storage device, such as database 160, and grouping device 120 and/or content device 140 may query database 160 to obtain the values, content fields, student data, and student profile data. In a further example, the set of student profiles may be generated using a student feature matrix with rows representing each student and columns corresponding to the plurality of content fields for each student. For example, the grouping device 120 alone or in cooperation with the content device 140 may generate the student feature matrix and obtain the student data, i.e., student name, student identification, content fields, and values, from the database 160.

Process 400 may also include organizing each of the student identification numbers into at least one student group by analyzing the set of student profiles (step 408). The set of student profiles are analyzed using a clustering method that evaluates the plurality of content fields. For example, device 120 may group students using at least one of the following types of clustering selected from a K-means, a modularity clustering, and a spectral clustering; however, other clustering and/or grouping methods may be applied. The organization of the students may include grouping the students based on the plurality of content fields. The groupings contemplated include both homogenous and heterogeneous grouping of the students.

In some examples, device 120 of system 100 may query database 160 to obtain the content fields and the student identification numbers. The student identification numbers may be unique or distinct numbers for each student to provide a way to identify each student and avoid inaccurate data if more than one student has the same name. The content fields may be associated with each student using their identification number. Each student identification number may include a set of content fields for that student. For example, grouping device 120 may query database 160 to obtain the student identification numbers and the content fields. The grouping device 120 may apply a clustering method stored therein or obtain a clustering method from database 160 and apply the clustering method to the content fields to group the students by identification number. After the clustering has been completed, process 400 may end (step 410).

Figure 5:
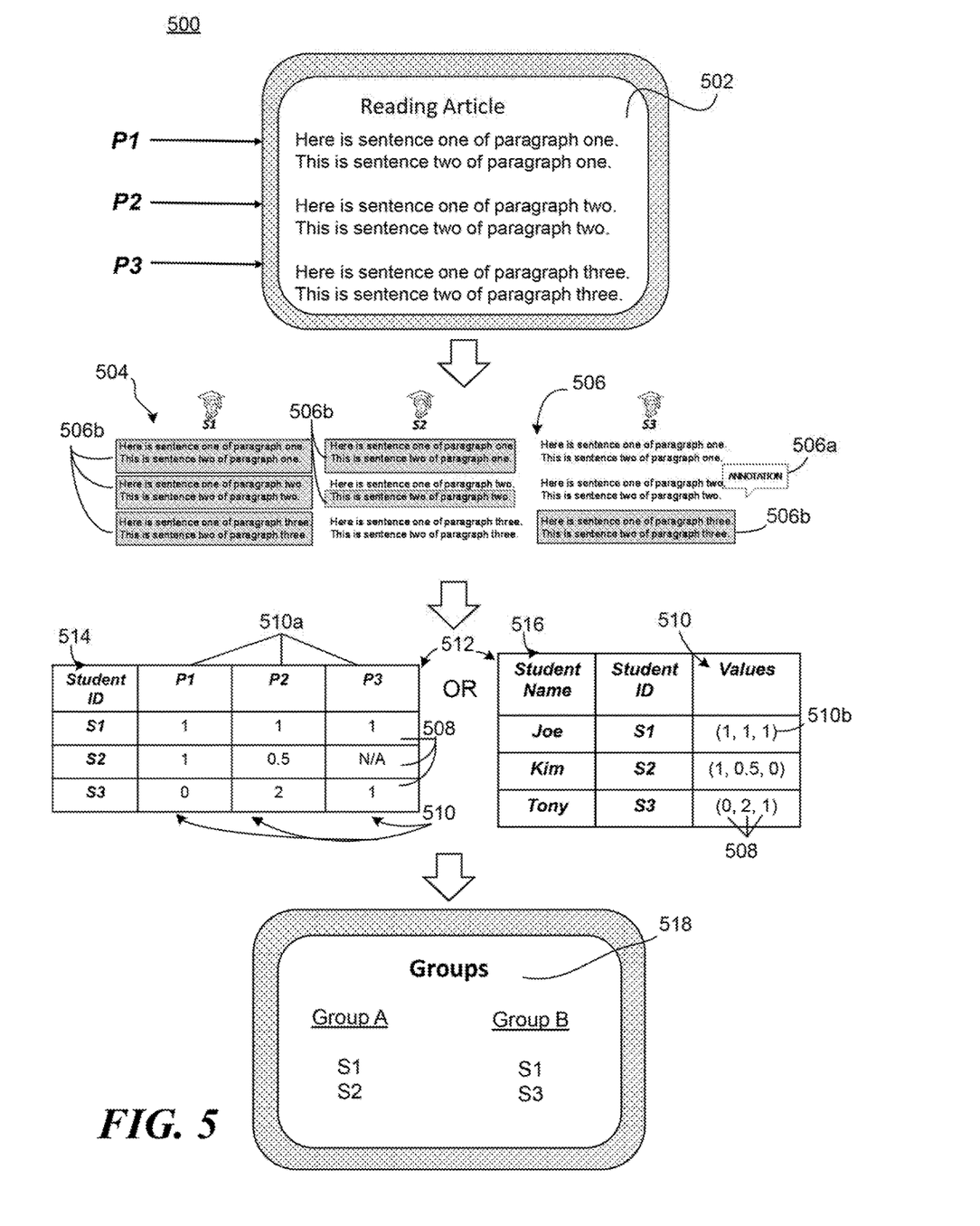
FIG. 5 illustrates a schematic diagram of a system for grouping students according to an example.

FIG. 5 illustrates a schematic diagram 500 of a system, such as system 100 of FIG. 1, for grouping students according to an example. The schematic diagram 500 includes a reading article as a content data collection 502. An excerpt of the content data collection 502 is illustrated to include three paragraphs, P1, P2, and P3 each having two sentences. The example illustrated in FIG. 5 and the paragraphs associated herein are simplified and refer to students for illustrative purposes only. People and non-student users may use the system described herein in a similar manner. Students, such as S1, S2, and S3 may read the article and mark the article using unstructured markings 506, such as annotations 506a and highlighting 506b. The article may be on a computing device in an electronic or digital format, such as a computer or tablet computing device, or the article may be in print form.

After students complete their review and marking, the data may be submitted for analysis. For example, content device 140 as illustrated in FIG. 1, may be used to collect the student data 504 including the student names 516, student identification numbers (also referred to as Student ID) 514, and unstructured markings 506. Content device 140 may obtain the student data 504 using electronic storage and/or circuitry, or content device 140 may receive a non-electronic version and convert it to a digital version, for example, using a scanner or scanning device to read the student data 504. Once in an electronic format, the student data 504 may be stored in a storage device, such as database 160. Values 508 corresponding to content fields 510 may then be extracted from student data 504 and provided to a grouping device, such as one or more of the grouping devices 120 illustrated in FIGS. 1-3.

In one example, the content fields 510 and the values 508 assigned to the content fields 510 may be defined by the content device 140. In another example, the content fields 510 and the value 508 assigned to the content fields 510 may be generated by the grouping device 120. In examples, content fields 510 may be defined by dividing the content data collection 502 into a plurality of content fields 510, such as P1, P2, and P3. Next, a set of values may be assigned to the plurality of content fields 510 to represent the plurality of unstructured markings 506. A simple example of value assignments include: 1 if the P1 is highlighted, 0.5 if one half of P1 is highlighted, NIA or 0 if none of P1 is highlighted, and 2 if P1 includes an annotation. These numbers were selected for simplicity of explaining the invention; however, other values 508 may be assigned and defined.

FIG. 5 illustrates student S1 as highlighting 506b all the text of paragraphs P1, P2, and P3; student S2 as highlighting all the text in paragraph P1, highlighting the second sentence or half of the text of paragraph P2, and highlighting none of the text in paragraph P3; and student S3 as highlighting none of the text in paragraph P1, providing an annotation 506a to paragraph P2, and highlights all the text in paragraph P3. Student profiles 512 may be generated by associating the values 508 and content fields 510 with student identification numbers 514. Referring to FIG. 1, student profiles 512 may be generated by grouping device 120 or content device 140. For example, student profiles 512 may be stored in storage device, such as database 160 as a matrix of rows and columns. The rows are illustrated to represent students and the columns are illustrated to manage the student identification number 514 and the plurality of content fields 510 for each student of the plurality of students. The content fields 510 are illustrated as separate columns for each field in 510a and as a single column 510b with a vector or comma separated list of values representing each content field location.

The matrix or other storage method as described position maps data to a specific value associated with a marking 506. One and/or a combination of the below may be used with a features matrix and/or features vector to duster or group students. For location based matrices, each value may be a unique location in text of the article. Any text that has no markings may be considered as one location or may be divided into several locations, with each assigned a value 508 for an unmarked location. By defining each location, all content fields 510 are represented as a vector of N positions, with each position mapping to a location in a text that is or may be marked by a student. In an example where unstructured markings 506 overlap, the value 508 and content field 510 may provide a one distinct mapping for two marks, if there is, for example, a large intersection of the overlapping portions. One example includes two students marking two sub sentences of the same sentence. Such markings are considered the same marking, and the values 508 in the matrix would be the same.

For topic, term, or concept based matrices, the text is extracted from the markings 506 to enable textual analysis of markings 508. In particular, text of the locations that are marked may be analyzed to find terms using an information retrieval method, or to find topics using a topic model that describe unstructured markings 506 of students. A similar analysis may be performed for annotations 506a, comments, and/or ratings that accompany unstructured markings 506. Moreover, annotations may also be analyzed to understand a student's sentiment, for example, if the student likes or understand the sentence.

Using student profiles 512, students may be organized into at least one group 518. The organization of the students may be completed through an analyzing of the student profiles 512, for example, content fields 510 may be used to cluster students. FIG. 5 illustrates two groups, Group A and Group B. Group A includes students S1 and S2. Group B includes students S1 and S3. Note that each student is in at least one group, and in an example, student S1 is in both groups. Depending on the type of grouping and the purpose of the grouping, it may be appropriate to place a student into more than one group. The groups may be organized by student identification numbers 514 which are unique and provide a distinct identifier for each student and avoid data inaccuracies if there are two students with the same name.

The disclosed examples may include systems, devices, computer-readable storage media, and methods for grouping students. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-7 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. AR such modifications and variations are intended to be included within the scope of this application and protected by the following claims.

We claim:

1. A system for grouping students comprising:
   a pre-processing engine implemented by a processor to receive a set of student data for a plurality of students, the set of student data including a set of values for a plurality of content fields, wherein each of the content fields corresponds to a respective location of a text passage of a content data collection document, and the set of values represent a plurality of unstructured markings associated with the content data collection;
   a profile engine implemented by the processor to generate a student profile by associating a student identification number with the plurality of content fields for the set of student data received; and
   an analysis engine implemented by the processor to organize the student identification numbers based on unstructured markings by different students to a same text passage indicated by the plurality of content fields.

2. The system of claim 1, wherein the pre-processing engine defines the plurality of content fields from the content data collection by:
   dividing the content data collection into the plurality of content fields, and
   assigning a set of values to the plurality of content fields, the set of values to represent the plurality of unstructured markings.

3. The system of claim 1, wherein the plurality of unstructured markings comprise at least one marking selected from a highlight marking, an underline, and an annotation to the content data collection readable by the pre-processing engine.

4. The system of claim 1, wherein the pre-processing engine scans the data set to obtain the plurality of unstructured markings.

5. A non-transitory computer-readable storage medium encoded with instructions that, when executed by a processor, perform a method, the method comprising:
   extracting a plurality of content fields from a set of student data collected from a plurality of students, wherein each content field of the plurality of content fields corresponds to a respective location of a text passage of a content data collection document and is assigned a value that represents an unstructured marking associated with the content data collection;
   associating the plurality of content fields with a set of student identification numbers to generate a plurality of student profiles; and
   clustering the set of student identification numbers based on an analysis of the plurality of content fields indicating unstructured markings by different students to a same text passage.

6. The non-transitory computer-readable storage medium of claim 5, wherein the unstructured marking comprises at least one marking selected from a highlight marking, an underline, and an annotation to the content data collection.

7. The non-transitory computer-readable storage medium of claim 5, wherein the analysis of the plurality of content fields includes grouping the set of student identification numbers based on common features.

8. A method to group students comprising:
   obtaining a set of student data including a plurality of content fields, wherein the plurality of content fields are associated with each student of a plurality of students, and wherein each content field of the plurality of content fields corresponds to a respective location of a text passage of a content data collection document and includes a value that represents an unstructured marking linked to the content data collection;
   generating a set of student profiles by assigning a student identification number to each of the plurality of content fields; and
   organizing each of the student identification numbers into at least one student group by analyzing the set of student profiles and based on unstructured markings by different students to a same text passage indicated by the plurality of content fields.

9. The method of claim 8, further comprising determining the values associated with the plurality of content fields for each student from the set of student data to build the set of student profiles.

10. The method of claim 8, further comprising defining a plurality of content fields in the content data collection and determining a set of values to represent the plurality of content fields.

11. The method of claim 10, wherein the plurality of content fields are defined based on an analysis of a plurality of unstructured markings on the content data collection.

12. The method of claim 8, wherein generating the set of student profiles comprises generating a student feature matrix with rows representing each student and columns corresponding to the plurality of content fields for each student.

13. The method of claim 8, wherein the set of student profiles are analyzed using a clustering method that evaluates the plurality of content fields.

14. The method of claim 13, wherein the clustering method comprises at least one of the following types of clustering selected from a K-means, a modularity clustering, and a spectral clustering.

15. The method of claim 8, further comprising defining each content field by assigning a value to represent the unstructured marking linked with a content data collection.

\* \* \* \* \*